(No Model.)

J. ROOT.
GRAIN SEPARATOR.

No. 247,274. Patented Sept. 20, 1881.

Witnesses
Geo. H. Strong.
Frank D. Cook.

Inventor
James Root
By Dewey & Co.
Attys.

N. PETERS, Photo-Lithographer, Washington, D. C.

ered upon them in the rear by the fan acts with some wind force.

UNITED STATES PATENT OFFICE.

JAMES ROOT, OF BLACK'S STATION, CALIFORNIA.

GRAIN-SEPARATOR.

SPECIFICATION forming part of Letters Patent No. 247,274, dated September 20, 1881.

Application filed April 14, 1881. (No model.)

*To all whom it may concern:*

Be it known that I, JAMES ROOT, of Black's Station, county of Yolo, State of California, have invented an Improved Grain-Separator; and I hereby declare the following to be a full, clear, and exact description thereof.

My invention relates to the class of agricultural implements known as "grain-separators."

Figure 1:
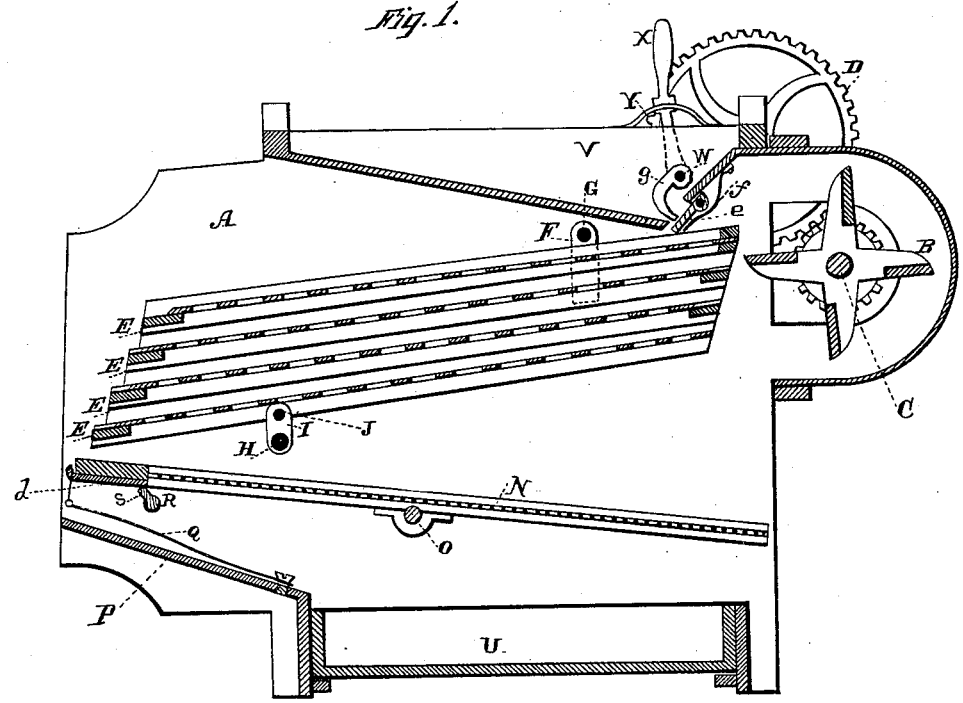
Figure 2:
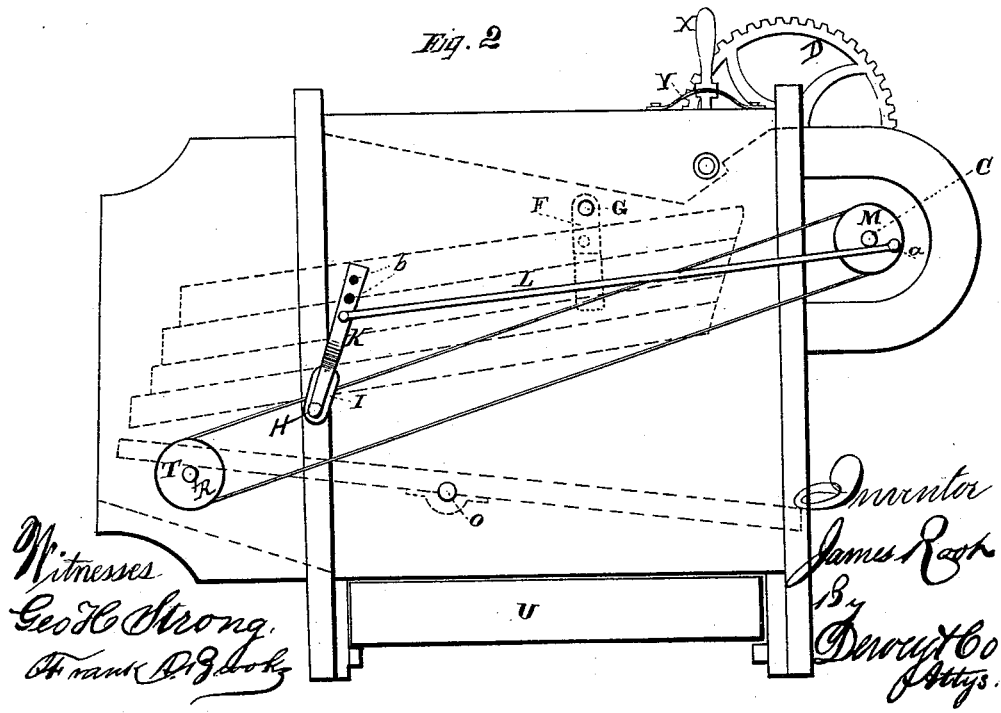

Referring to the accompanying drawings, Figure 1 is a longitudinal vertical section. Fig. 2 is a side view.

Let A represent the frame of the machine, having the usual fan, B, upon the shaft C, operated by gearing from the main driving-wheel D, as shown. Within the frame is the set of perforated sieves E, attached firmly together, one above the other. They are given a slight downward inclination toward the rear, and are swung on loose links F, journaled upon the transverse rod or bar G. The point at which they are pivoted or hung will permit them to be moved forward and back in a kind of irregular curve.

Under the set of sieves E, toward the rear of the machine and journaled in its sides, is a transverse rod or shaft, H, having keyed to it the vertical crank-arms I, having rounded upper ends. A rod, J, passing under the lowest of the sieves, and having both ends attached to the frame of said sieve, passes through the upper ends of the crank-arms I, forming for them a shaft or axle, upon which they are journaled. The set of sieves E rest upon the rounded ends of the crank-arms. Motion is transmitted to these arms as follows: The shaft H, on one end outside of the frame, has an upturned crank, K, connected by a pitman, L, with a crank-pin, *a*, upon the grooved pulley M, secured to the end of the fan-shaft C. The crank K is provided with a series of holes, *b*, to receive the pitman L at different points, and thus to regulate the oscillation of the shaft H. This oscillation could also be regulated by putting the crank-pin *a* nearer to or farther from the center of the pulley M.

The set of sieves E, hung or pivoted to the movable arms F, and given motion by the oscillating crank-arms I, upon which they travel, have a peculiar movement forward and upward and backward and downward in a kind of wave, which is very effective in sifting the grain.

Below the sieves, and within the frame A, is the screen N, having an inclination the reverse of the sieves. This screen is pivoted near its center by the rod O, passing through the frame, as shown.

At the rear of the machine, attached to the cheat-board P, is a spring, Q. The rear end of the screen N is connected with this spring by a cord or wire, as shown, whereby the screen is held down at that end.

R represents a rotating shaft, having a central flange or tappet, S. The end of the shaft is provided with the grooved pulley T, connected with the pulley M upon the fan-shaft C by a proper driving-belt. A rotary motion is thus transmitted to the shaft R. Under the end of the screen N is a metal plate or surface, *d*, which receives the impact of the flange S as it revolves. When this flange strikes the plate *d* it raises the rear end of the screen about its pivoted center, and as soon as it passes the plate the spring Q draws the screen down, giving to it a quick and sudden jerk, which is very desirable, and will cause the wheat to clear itself of wild oats and mustard, which, being heavy, will stick with the wheat through all the sieves; but by this sudden jar they are dropped through the fine screen N into the cheat-box U, from whence they can be removed.

V represents the hopper, one side of which is a piece of heavy sheet-iron. The feed-opening is provided with a door, *e*, supported underneath by end straps, and held well up to the opening by a strong spring, *f*, attached to the sheet-iron plate forming one side of the hopper.

W is a rod or shaft journaled in the sides of the frame, provided with a curved arm or lever, *g*, secured to its center, the point of which presses upon the spring-door *e*. A lever, X, operates the shaft W, and a rack, Y, holds the lever in place when adjusted. Thus the spring-door *e* can be pressed down by the curved arm *g* to regulate the feed.

The operation of the machine is in the main similar to implements of this class. The action of the fan-blower is the same, and the passage of the stuff through the sieves and final separation of the cheat from the wheat and discharge of the latter present generally no new features; and therefore I disclaim invention, except in so far as particular construction contributes to an improved result.

Having thus described my invention, what I claim as new, and desire to secure by Letters Patent, is—

In a grain-separator, the combination of the inclined set of sieves E, side arms, F, crank-arms I, shaft H, crank K, pitman L, fan-shaft C, with the oppositely-inclined screen N, pivoted at its center, spring Q, shaft R, having the flange S, and pulleys T and M, and the connecting-belt and fan-shaft C, substantially as described, and for the purpose set forth.

In witness whereof I have hereunto set my hand.

JAMES ROOT.

Witnesses:
R. M. HUSTON,
WARREN COLE.